W. BARTHOLOMEW.
STOP MECHANISM FOR MANGLES.
APPLICATION FILED OCT. 28, 1912.

1,133,699.

Patented Mar. 30, 1915.
6 SHEETS—SHEET 1.

WITNESSES

INVENTOR
William Bartholomew
Attorney

W. BARTHOLOMEW.
STOP MECHANISM FOR MANGLES.
APPLICATION FILED OCT. 28, 1912.

1,133,699.

Patented Mar. 30, 1915.
6 SHEETS—SHEET 3.

WITNESSES
Philip E. Barnes

INVENTOR
William Bartholomew
E. B. Stocking
Attorney

W. BARTHOLOMEW.
STOP MECHANISM FOR MANGLES.
APPLICATION FILED OCT. 28, 1912.

1,133,699.

Patented Mar. 30, 1915.
6 SHEETS—SHEET 6.

WITNESSES
Philip E. Barnes

INVENTOR
William Bartholomew
E. B. Stocking, Attorney

UNITED STATES PATENT OFFICE.

WILLIAM BARTHOLOMEW, OF CHICAGO, ILLINOIS, ASSIGNOR TO THE TROY LAUNDRY MACHINERY COMPANY, LIMITED, OF CHICAGO, ILLINOIS, A CORPORATION OF NEW YORK.

STOP MECHANISM FOR MANGLES.

1,133,699.  Specification of Letters Patent.  Patented Mar. 30, 1915.

Original application filed August 17, 1910, Serial No. 577,677. Divided and this application filed October 28, 1912. Serial No. 728,312.

*To all whom it may concern:*

Be it known that I, WILLIAM BARTHOLOMEW, a citizen of the United States of America, residing at Chicago, in the county of Cook and State of Illinois, have invented certain new and useful Improvements in Stop Mechanism for Mangles, of which the following is a specification.

This invention relates to a mangle or ironing machine for flat work and particularly to means for controlling the driving mechanisms and lifting the rolls from their coöperating steam chests, and comprises a division of my application filed August 17, 1910, Serial #577,677.

The invention has for an object to provide a novel and improved construction of lifting mechanism for separating the clothed rolls from the coöperating steam chests.

Another object of the invention is to provide a novel and improved construction of guard board and connections mounted to coöperate with a tripping device whereby the operation of the machine may be stopped, together with means for resetting or starting the machine after having been so tripped.

A further object of the invention is to provide a novel and improved construction of safety device adapted to stop the operation of the machine and arranged to operate the raising mechanism for the rolls.

Other and further objects and advantages of the invention will be hereinafter set forth and the novel features thereof defined by the appended claims.

In the drawings

Like numerals of reference refer to like parts in the several figures of the drawings.

Figure 1:
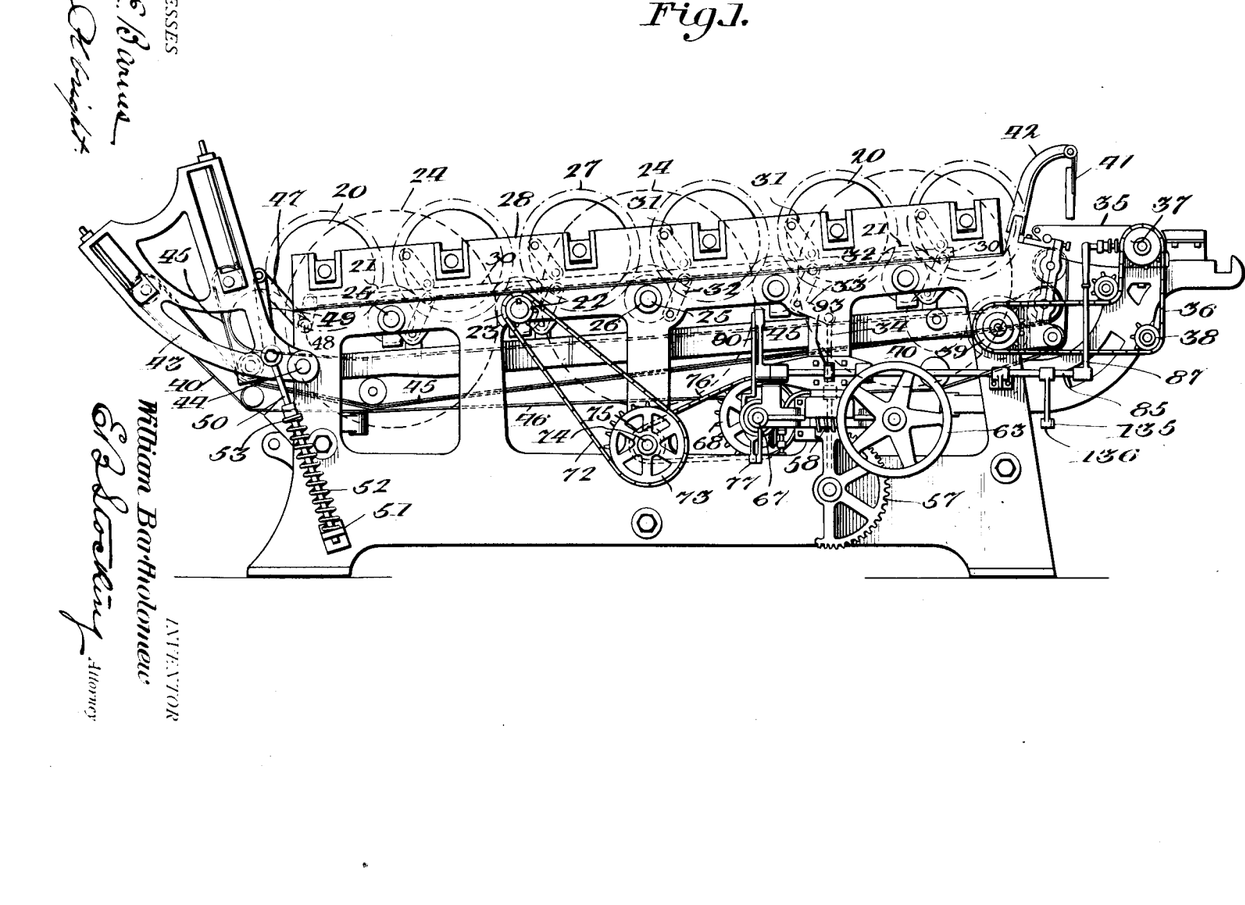
—Figure 1 is a side elevation of the mangle.

The invention is adapted for application to any desired construction of mangle or ironing machine, but for the purpose of illustration is here shown in connection with a six roll flat work ironer, in which the usual clothed rolls 20 are adapted to coöperate with the steam chests 21 as indicated by dotted lines in Fig. 1. These rolls may be driven in any desired manner, for instance from a power shaft 22 provided with a pinion 23 which meshes with driving gears 24 mounted upon the shafts 25, which shafts also carry pinions 26 disposed in driving relation to gears 27 upon the rolls by which the latter are rotated in the same direction and in the usual manner in the art. The rolls 20 are mounted in a movable frame 28 disposed at the upper face of the main frame 29 of the machine and this movable frame is adapted to be shifted to raise the rolls from the steam chests by means of the longitudinally extending rod 30, as shown by dotted lines in Fig. 1. This rod is connected by pivoted links 31 with the movable frame 28 and by means of similar links 32 with the main frame 29. One of the links 32 is provided with a bell crank 33 from which a lifting rod 34 extends downward.

At the feed end of the mangle, the usual feed apron 35 is provided and adapted to be driven through the chain and sprocket connections 36 as shown in Fig. 1. These may comprise a sprocket 37 upon the shaft of the feed apron roller over which the chain 36 extends and is guided by the idlers 38 to the sprocket 39 disposed upon a shaft driven by geared connections 40 from the roll rotating means. Above the feed apron 35, a finger or guard board 41 is mounted by means of the brackets 42 as will be hereinafter described. At the delivery end of the machine, a belt or apron bracket 43 is pivotally mounted at 44 and carries the apron 45 which contacts with the under face of the chests to effect a drying and ironing action during the return of the goods toward the feed end of the mangle in the manner usual in this art. The goods are again returned toward the delivery end of the machine by means of the return apron 46 which coöperates with the under face of the lower ply of the apron 45 and extends to the apron bracket 43 where the ironed article is delivered. This bracket is adapted to be swung away from the final roll and steam chest so as to remove the upper ply of the apron 45 from contact with the under face of the chests by means of a bell crank lever 47 pivoted to the main frame at 48 and connected pivotally to the rod 30 by which the roll carrying frame is lifted. This lever 47 has a link 49 pivotally connected thereto and to the bracket 43. For the purpose of cushioning the movement of this bracket and retaining it in position under proper tension, a rod 50 is extended downward therefrom and passes through a guide 51 upon the frame 29. This rod is surrounded by a tension spring 52 which bears against the guide at its lower end and contacts with an adjustable collar 53 secured to the rod at its upper end.

The roll lifting rod 34 is provided at its lower end with a cam sleeve 54 adapted to embrace a cam 55 disposed upon the shaft 56 which is also provided with a sector 57 meshing with a worm 58 upon the countershaft 59, as shown in Figs. 3, 4, 5 and 6. The countershaft is provided at one end with a beveled gear 60 meshing with a coöperating gear 61 carried by the shaft 62 which is provided with a hand wheel 63 by which the rolls may be raised or lowered by hand when desired, or if the power connections are disconnected. The opposite end of the countershaft 59 is provided with a beveled gear 64 which meshes with the oppositely disposed beveled gears 65 and 66 which are loosely mounted upon the shaft 67 provided with a driving sprocket 68. Slidingly secured upon the shaft 67 is a clutch member 69 provided at its opposite sides with the clutch faces 70 adapted to coöperate with the clutch member 71 carried by the beveled gears 65 and 66. The shaft 67 is adapted to be driven from the power shaft 22 by means of the chain 72 extending to the sprocket 75 upon the shaft 74. This shaft also carries a sprocket 75 from which a driving chain 76 extends to the sprocket 68 upon the shaft 67 as shown in Fig. 1.

For the purpose of shifting the clutch 69 to a neutral or nonoperative position when the rolls reach the limit of their movement either toward or from the chests, a shifting lever 77 is pivotally mounted at 78 upon the supporting bracket 79 and has a bifurcated portion embracing the clutch 69 in the usual manner. This lever is provided with a lateral crank arm 80 having at its outer end a sleeve 81 mounted to slide upon a depending rod 82 which is secured to the rod 34 by a bracket 83. The lower end of this rod is threaded and provided with adjustable stop nuts 84 thereon at opposite sides of the sleeve 81. It will be seen that in the reciprocation of the rod 34, the stop nuts will engage the crank arm 80 and operate the clutch member automatically when the proper travel has been secured.

Figure 3:
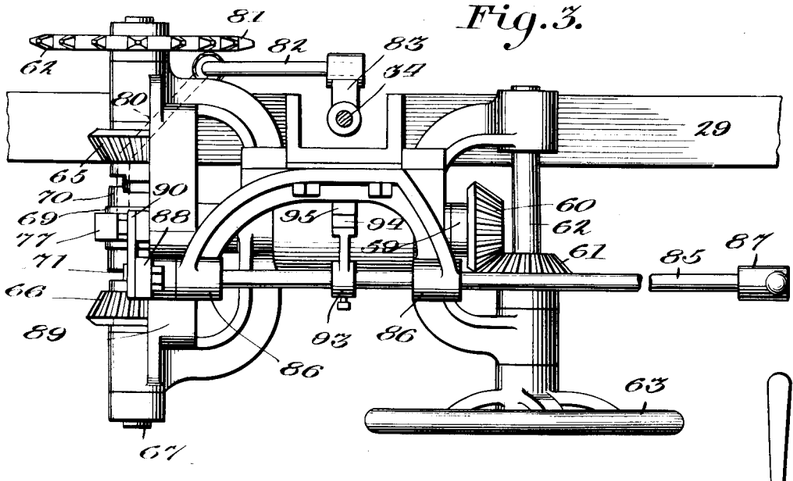
Fig. 3, is a top plan view of the roll raising mechanism.
Figure 4:
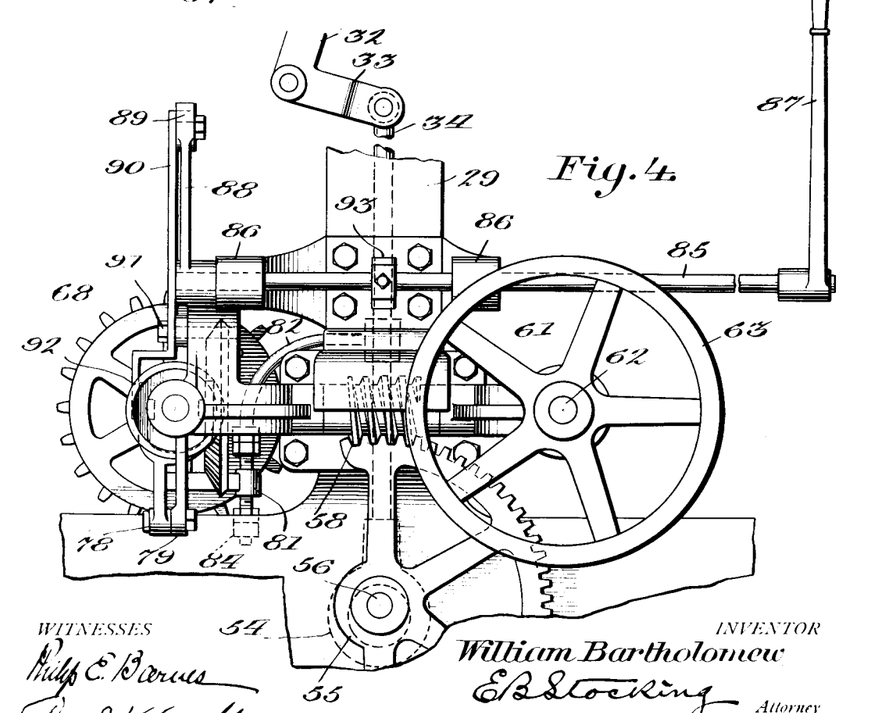
Fig. 4 is a front elevation of this mechanism.
Figure 5:
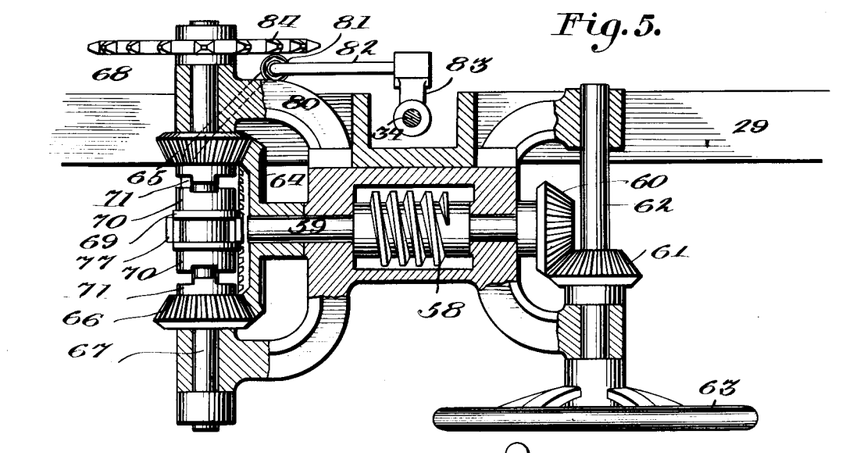
Fig. 5 is a central horizontal section through the roll raising means.
Figures 6, 7:
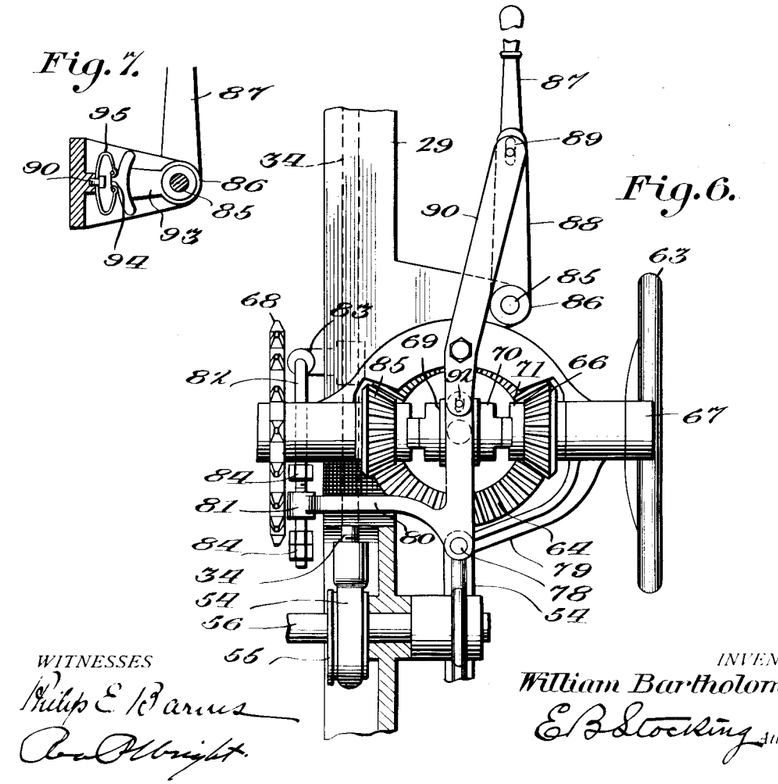
Fig. 6 is an end elevation thereof looking from the left of Fig. 4.
Fig. 7 is a detail section showing means for retaining the hand lever in position.
Figure 8:
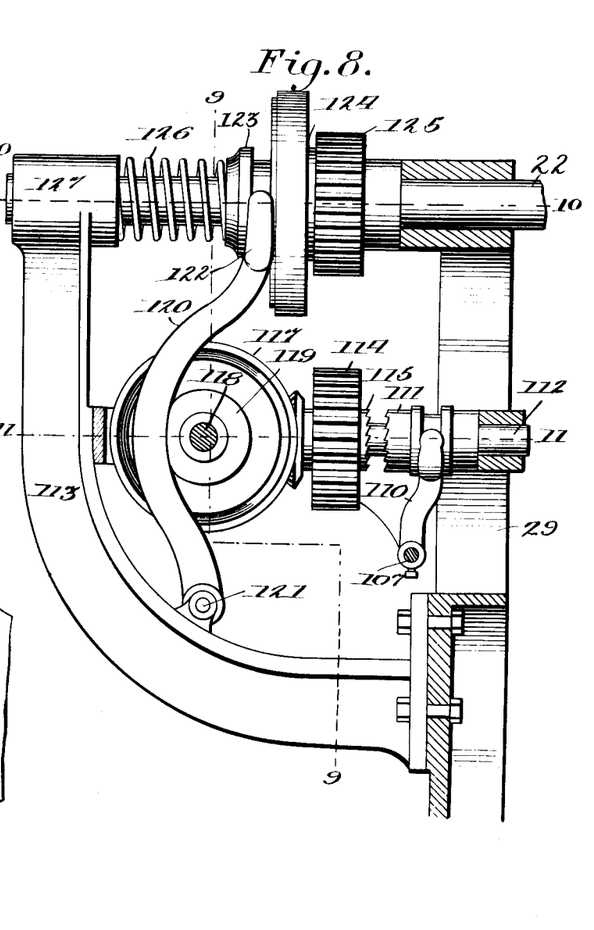
Fig. 8 is a side elevation of the safety device by which the driving power is disconnected.

Under some conditions, it is desirable to shift the clutch manually to actuate the rod 34 in either direction or entirely disconnect the power therefrom. This may be conveniently accomplished by means of a rock shaft 85 mounted in bearings 86 upon the main frame and provided with an operating lever 87 as shown in Figs. 3 and 4. The shaft 85 is provided with a crank arm 88 which, at its outer end, is formed with a slotted connection 89 with a lever 90 pivoted at 91. The lower end of this lever is provided with a pin working in slotted connection 92 in the clutch lever 77 in order to shift the latter by the oscillation of the rock shaft 85. For the purpose of retaining or holding the rock shaft 85 in its adjusted position, a holding sector 93 is adjustably secured thereon and provided upon its curved outer face with a lug or projection 94 adapted to seat between the ends of the looped spring 95 secured upon a fixed part 96. By this means, the shaft and its operating lever may be securely retained in position to render the clutch inoperative.

Figure 2:
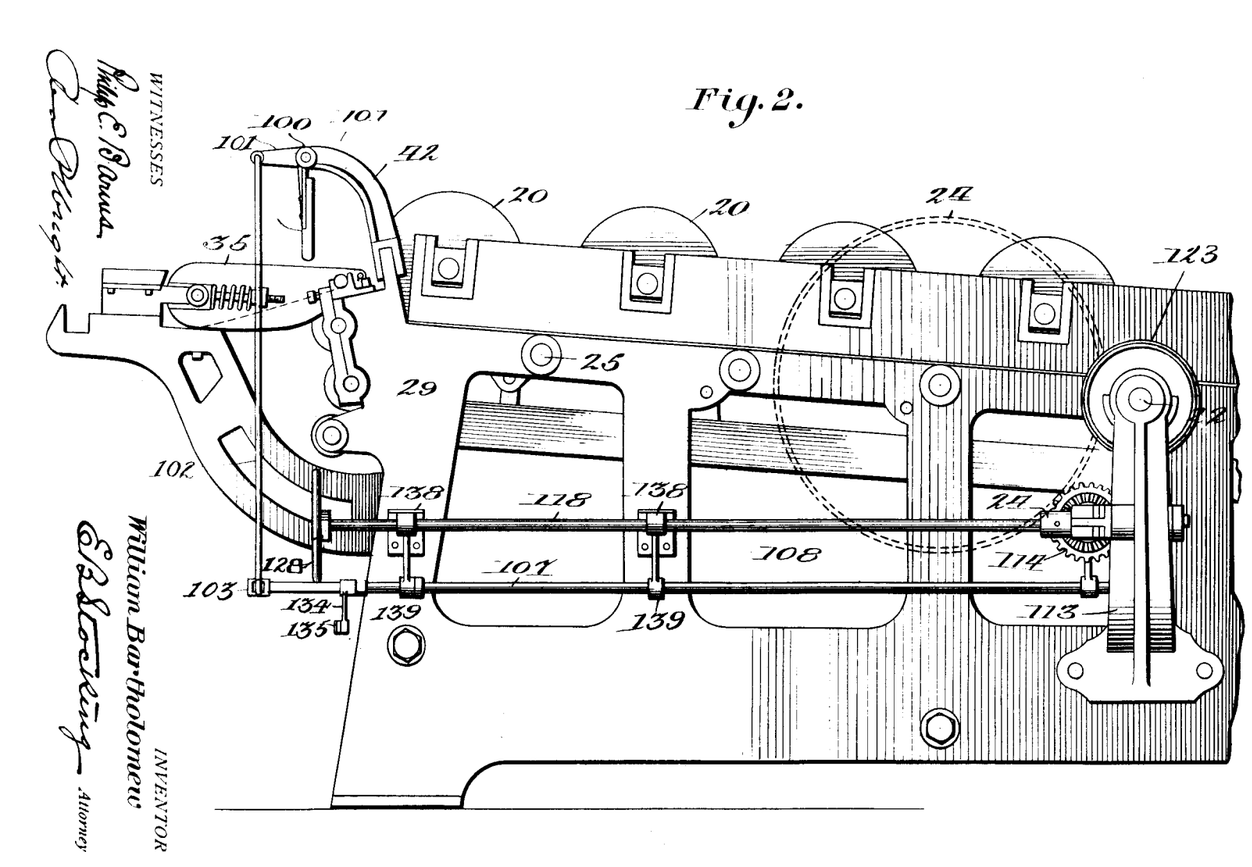
Fig. 2 is a detail side elevation of the opposite side of the machine at the feed end thereof.
Figure 9:
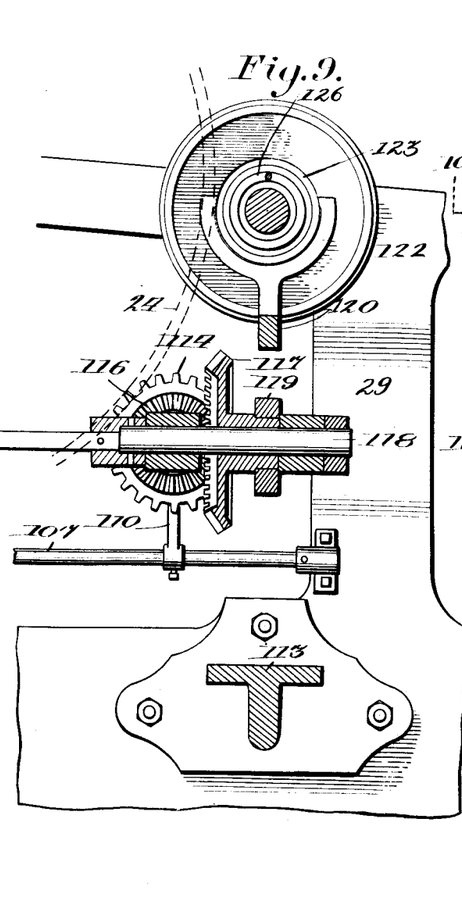
Fig. 9 is a vertical section on line 9—9 of Fig. 8.
Figure 10:
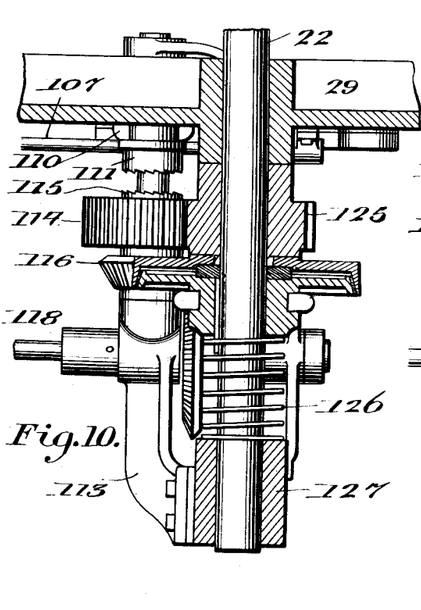
Fig. 10 is a horizontal section on line 10—10 of Fig. 8.
Figure 11:
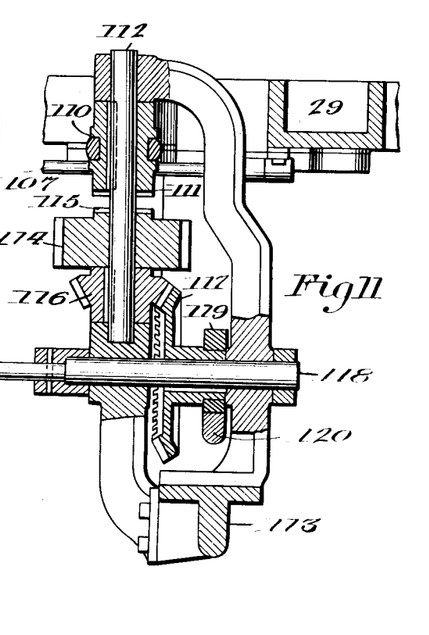
Fig. 11 is a similar section on line 11—11 of Fig. 8.
Figure 12:
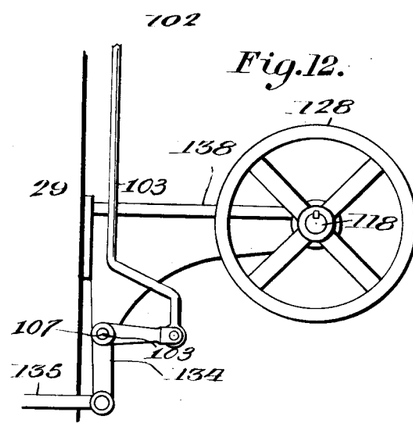
Fig. 12 is an end elevation of the tripping and resetting mechanism.
Figure 13:
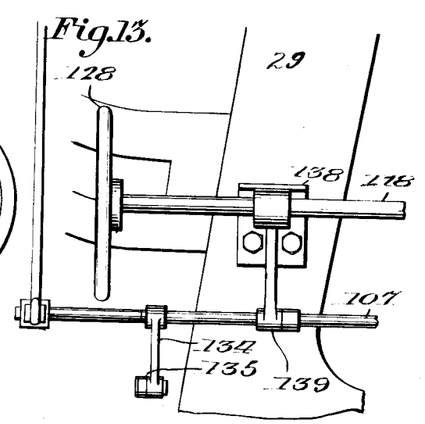
Fig. 13, is a side elevation thereof.

The guard board 41 is pivoted at 100 upon the bracket 42 and provided with a crank arm 101 from which a trip rod 102 extends to a lever arm 103 on shaft 107. The shaft 107 is provided with a bifurcated crank arm 110 adapted to actuate an auxiliary clutch 111 slidably mounted upon the shaft 112. This shaft and the other members of the safety device for disconnecting the power are supported at their outer ends in the bearing bracket 113. The shaft 112 is provided with a loosely mounted pinion 114 thereon, provided with a clutch member 115 to coöperate with the clutch 111. The hub of the pinion 114 is provided with a beveled gear 116 which meshes with a coöperating gear 117 mounted upon the shaft 118. The hub of the gear 117 has secured thereon an eccentric 119 which is adapted to travel in contact with a shifting lever 120 pivoted at its lower end 121 to the bracket 113 and bifurcated at its upper end 122 to embrace a clutch member 123 which is slidingly keyed upon the power shaft 22 and coöperates with a clutch member 124 carried by the driving pinion 125 loose upon the power shaft. The clutch members 123 and 124 are normally held in engagement by the spring 126 surrounding the power shaft and bearing upon the clutch 123 at one end and at its opposite end against the bearing box 127 of the bracket 113. The pinion or gear 114 is adapted to be driven by a meshing contact with one of the gears 24 for driving the rolls, as shown in Figs. 2 and 9. By this construction, it will be seen that if the shaft 107 be tripped, the clutch 111 will be moved into engagement with the gear 114, thus causing a driving of the parts to rotate the cam 119 in contact with the shifter lever and thus move the clutch 123 out of engagement and stop the driving of the parts.

After the operation of the tripping shaft, it is desirable to reset the parts and this may be accomplished by rotating the shaft 118 to bring the cam 119 in such position that the spring 126 may move its clutch members into contact. This may be accomplished by means of a hand wheel slidingly keyed upon the shaft 118.

Under some conditions, it is desirable to automatically and simultaneously raise the rolls and remove the aprons from the chests as the power is disconnected and for that purpose the lever 134 is mounted upon the shaft 107. The lower end of this lever is connected by a rod 135 with a depending arm 136 carried by the rock shaft 85 at the opposite side of the machine, as shown in Fig. 1, in order to automatically operate the roll raising mechanism. The resetting shaft is mounted in bearings 138 carried by the main frame and the trip shaft 107 is supported in depending bearings 139, as shown in Fig. 2.

In the operation of the invention, the articles to be ironed are fed between the rotating rolls and steam chests to be ironed on one side and are then received by the apron 45 and carried back in contact with the under face of the chests to further iron and dry the articles and are finally returned toward the delivery end between the parallel aprons extending to the pivoted apron bracket. If at any time it is desired to stop the operation of the machine, the rolls are lifted from the chests to prevent scorching or injury to the clothing thereof and this raising movement automatically swings the apron bracket away from the final roll and chest, thus dropping the apron from contact with the under face of the chest automatically. This same action occurs in the operation of the guard board as, if it be pressed inward by contact with the hand or fingers of the operator, the shaft 107 is operated and through its connections, the power is disconnected to stop the operation of the machine and automatically raise the rolls from the chests and drop the aprons therefrom. The extent of movement of the roll raising device is automatically controlled and the hand operating lever for shifting the controlling clutch adapted to be firmly held in position. The rock shaft controlling the clutch for the raising mechanism is adapted to be operated either by a hand lever or by the guard board. The parts of the safety device for unclutching the power through the movement of the guard are adapted to be reset for starting the machine by returning the controlling cam to proper position. The trip shaft is automatically reset by the weight of the guard board and the inward movement of this board effects the operation of the lever system above described for disconnecting the power and for raising the rolls.

The invention presents a very efficient and economically constructed mechanism for controlling the relation of the rolls and apron to the steam chests and also to guard against injury to the operator in the introduction of goods to the rolls at the feed apron.

I claim:

1. In a mechanism of the kind described, a stationary member and a coöperating movable member, means for supporting said stationary member and movable member, means for driving said movable member, and a guard device constructed and arranged to automatically disconnect the driving means from said movable member and raise said movable member from contact with said stationary member.

2. In a mechanism of the kind described, a stationary member and a coöperating movable member, means for supporting said stationary member and movable member, means for driving said movable member, and a guard device constructed and arranged to simultaneously disconnect the driving means for said movable member and raise said movable member from said stationary member.

3. In a mechanism of the kind described, a stationary member and a coöperating movable member, means for supporting said stationary member and movable member, means for driving said movable member, and a guard device disposed at the feed of said movable member and constructed and arranged to automatically disconnect the driving means for the movable member and raise said movable member from contact with said stationary member.

4. In a mechanism of the kind described, a stationary member and a coöperating movable member, means for supporting said stationary member and movable member, means for driving said movable member, a guard device mounted relative to said movable member, a trip shaft connected to be operated thereby, and means connected to said trip shaft for shifting the driving connection for said movable member and raise said movable member from said shaft.

5. In a mechanism of the kind described, a stationary member and a coöperating movable member, means for supporting said stationary member and movable member, means for driving said movable member, a guard device mounted relative to said movable member, a trip shaft connected to be operated thereby, and a clutch device connected to a lever carried by said trip shaft for shifting the driving connection for said movable member and raise said movable member from said stationary member.

6. In a mechanism of the kind described, a stationary member and a coöperating movable member, a shaft for driving said movable member, a driving gear for said shaft provided with a clutch member, a sliding coöperating clutch member mounted upon said shaft, a shifting lever connected to said coöperating clutch member, a shaft provided with a cam mounted to engage said lever, a beveled gear carried by said cam shaft, a coöperating beveled pinion, a driving gear carried by said pinion and provided with a clutch member, a coöperating clutch member, and a trip shaft provided with an arm for operating said coöperating clutch member.

7. In a mechanism of the kind described, a stationary member and a coöperating movable member, a shaft for driving said movable member, a driving gear for said shaft provided with a clutch member, a sliding coöperating clutch member mounted on said shaft, a shifting lever connected to said coöperating clutch member, a shaft provided with a cam mounted to engage said lever, a beveled gear carried by said cam shaft, a coöperating beveled pinion, a driving gear carried by said pinion and provided with a clutch member, a coöperating clutch member, a trip shaft provided with an arm for operating said coöperating clutch member, and a guard device mounted to control the operation of said trip shaft.

8. In a mechanism of the kind described, a stationary member and a coöperating movable member, means for driving said movable member, means for raising said movable member from said stationary member, means for controlling the driving of said movable member, a guard device connected to control said means, and a connection from said controlling means to the means for raising said movable member from said stationary member.

9. In a mechanism of the kind described, a stationary member and a coöperating movable member, means for driving said movable member, means for raising said movable member from said stationary member, means for controlling the driving of said movable member, a guard device connected to said controlling means, a connection from said controlling means to the means for raising said movable member from said stationary member, and a restoring device connected to said connection.

10. In a mechanism of the kind described, a stationary member and a coöperating movable member, means for driving said movable member, means for raising said movable member from said stationary member, means for controlling the driving of said movable member, a guard device connected to said controlling means, a connection from said controlling means to the means for raising said movable member from said stationary member, a lever carried by said controlling means and connected with said movable member raising means, and means for operating said lever.

11. In a mechanism of the kind described, a series of stationary members, a series of coöperating movable members, means for driving said movable members, means for raising said movable members from contact with said stationary members, and a guard board disposed adjacent thereto and connected to control said driving and raising means.

12. In a mechanism of the kind described, a series of stationary members, a series of coöperating movable members, means for driving said movable members, means for raising said movable members from contact with said stationary members, a guard board disposed adjacent thereto and connected to control said driving and raising means, and a shaft provided with an operating lever and connected to operate the raising means for said movable members.

13. In a mechanism of the kind described, a series of stationary members, a series of coöperating movable members, means for driving said movable members, means for raising said movable members from contact with said stationary members, a guard board disposed adjacent thereto and connected to control said driving and raising means, a shaft provided with an operating lever and connected to operate the raising means for said movable members, and a shaft connected to restore the driving means for said movable members to initial position.

14. In a device of the kind described, a stationary member and a coöperating movable member, means for driving said movable member, means for raising said movable member from said stationary member, means for controlling the driving of said movable member, a guard device connected to said controlling means, a connection from said controlling means to the means for raising said movable member from said stationary member, and a restoring device connected to said connection.

15. In a mechanism of the kind described, a stationary member and a rotatable movable member coöperating therewith, means for supporting said movable member, means for driving said rotary member, and a guard device constructed and arranged to automatically disconnect the driving means from said rotary member and to raise said rotary member out of contact with the stationary member.

In testimony whereof I affix my signature in presence of two witnesses.

WILLIAM BARTHOLOMEW.

Witnesses:
CHARLES M. LEARY,
JOHN HOERMANN.